United States Patent
Estell et al.

(10) Patent No.: US 7,546,979 B1
(45) Date of Patent: Jun. 16, 2009

(54) TRAPEZOIDAL PANEL PIN JOINT ALLOWING FREE DEFLECTION BETWEEN FUSELAGE AND WING

(75) Inventors: Patricia W. Estell, Woodinville, WA (US); John H. Polk, Carnation, WA (US)

(73) Assignee: The Boeing Company, Chicago, IL (US)

( * ) Notice: Subject to any disclaimer, the term of this patent is extended or adjusted under 35 U.S.C. 154(b) by 326 days.

(21) Appl. No.: 11/522,018

(22) Filed: Sep. 15, 2006

(51) Int. Cl.
*B64C 1/00* (2006.01)

(52) U.S. Cl. .................... 244/123.1; 244/131

(58) Field of Classification Search .............. 244/46, 244/49, 45 R, 47, 34 R, 131, 72, 123.2, 123.3, 244/123.4, 123.7; 403/150, 157
See application file for complete search history.

(56) References Cited

U.S. PATENT DOCUMENTS

| | | | | |
|---|---|---|---|---|
| 1,549,689 | A | * | 8/1925 | Rohrbach .................... 244/131 |
| 2,141,534 | A | * | 12/1938 | Hudson ........................ 244/49 |
| 2,242,147 | A | * | 5/1941 | Salisbury .................. 244/123.8 |
| 3,279,721 | A | * | 10/1966 | Dethman ...................... 244/46 |
| 4,390,153 | A | * | 6/1983 | Wuermseer ................. 244/131 |
| 4,893,964 | A | | 1/1990 | Anderson |
| 2006/0018710 | A1 | | 1/2006 | Durand et al. |

FOREIGN PATENT DOCUMENTS

| | | |
|---|---|---|
| EP | 1537993 A2 | 8/2005 |
| EP | 1537993 A3 | 8/2005 |
| GB | 2055727 A | 3/1981 |
| RU | 1376424 A1 | 10/1995 |

OTHER PUBLICATIONS

Roskam, Dr. Jan, "Airplane Design; Part III: Layout Design of Cockpit, Fuselage, Wing and Empennage: Cutaways and Inboard Profiles," 1986, Part III, Chapter 4, p. 222.
International Search Report; PCT/US2007/016376; Nov. 14, 2008.

* cited by examiner

*Primary Examiner*—Michael R Mansen
*Assistant Examiner*—Michael Kreiner
(74) *Attorney, Agent, or Firm*—Karin Peterka, Esq.

(57) ABSTRACT

The invention is directed a trapezoidal panel pin joint for allowing deflection of an aircraft between a fuselage section and a wing section, wherein the pin joint comprises a vertical pin portion, a lug portion, and a clevis portion; wherein at least one vertical flexible tee member is positioned below the pin joint; and wherein the pin joint is coupled to at least two horizontal flexible tee members, such that the pin joint and vertical and horizontal flexible tee members, in combination, release two rotational degrees of freedom.

14 Claims, 5 Drawing Sheets

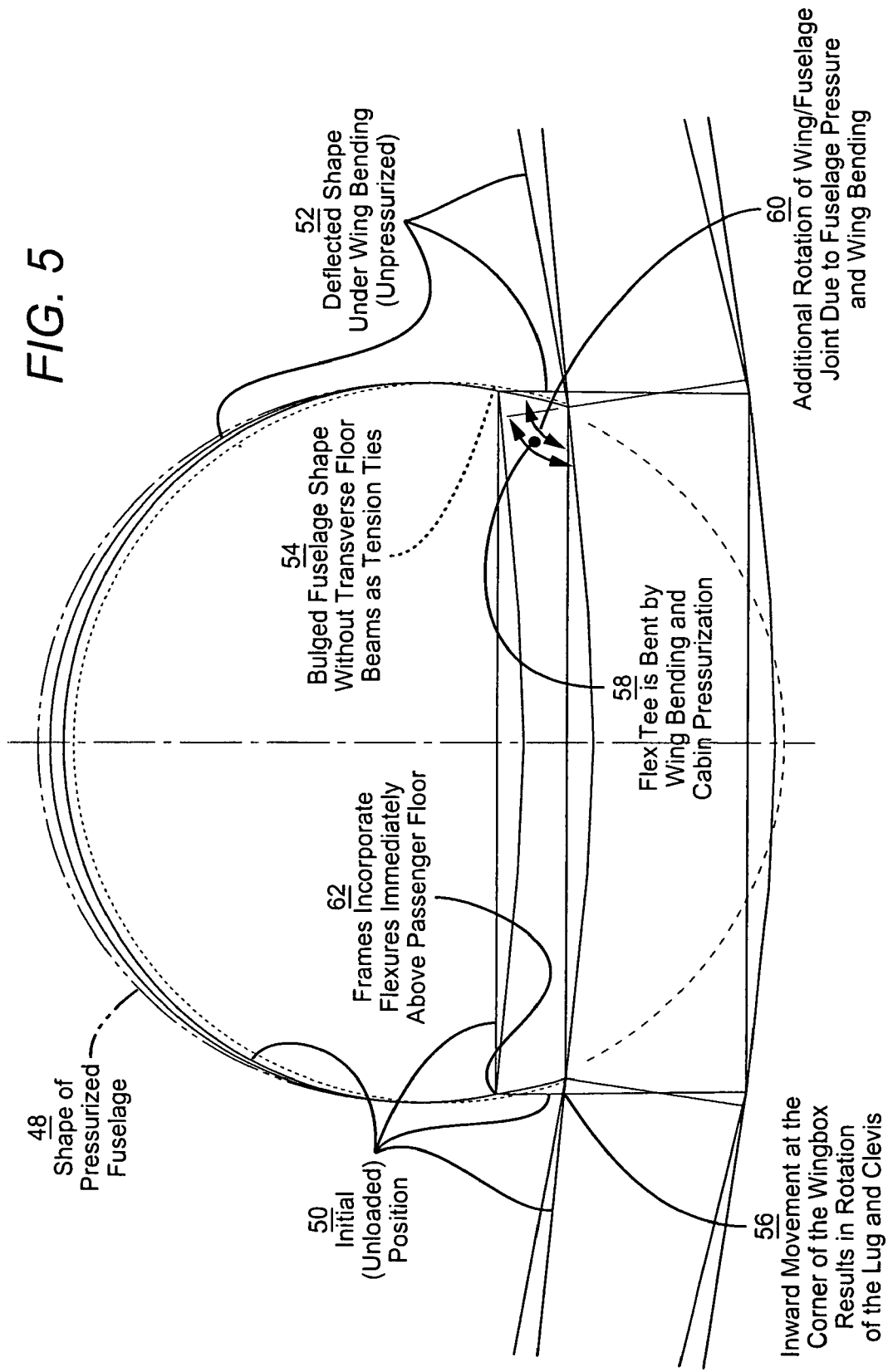

TRAPEZOIDAL PANEL PIN JOINT ALLOWING FREE DEFLECTION BETWEEN FUSELAGE AND WING

BACKGROUND OF THE INVENTION

1) Field of the Invention

The invention relates to a pin joint in an aircraft fuselage. More particularly, the invention relates to a trapezoidal panel pin joint allowing free deflection between the fuselage and the wing of an aircraft.

2) Description of Related Art

In aircraft, large deflections between the wing and the fuselage due to wing bending can cause design and durability problems in the fuselage and fuselage to wing attachment structure. Known aircraft have wing to fuselage attachment structure that have accounted for this differential deflection by separating the top of the wing box and the fuselage with a horizontal flexible tee member. Known aircraft have a trapezoidal panel that is an extension of the wing rib at the wing/fuselage joint. Known trapezoidal panel designs have accounted for the differential deflection between the wing and the fuselage/fixed pressure deck by vertically separating the trapezoidal panel and fixed pressure deck, allowing the fuselage skin panel and frames to deflect over a relatively long vertical distance. Thus, wing deflection is absorbed by bending of the fuselage frames and skin panels above the trapezoidal panel. Known metallic fuselage designs use stiffened fuselage panels and physical separation to enable the deflection that occurs at the wing rear main spar. However, such known designs can have less vertical distance to incur the large wing deflections, and this can induce stresses to the wing and fuselage. This can increase the risk of durability of the parts, can require more structure, and can increase the weight of the aircraft. In addition, known designs only release one rotational degree of freedom.

Accordingly, there is a need for an improved pin joint design in an aircraft fuselage that does not have the problems associated with known designs.

SUMMARY OF THE INVENTION

The invention satisfies this need for an improved pin joint design in an aircraft fuselage. None of the known pin joint designs provides all of the numerous advantages of the invention. Unlike known designs, the design of the invention provides the following advantages: the trapezoidal panel pin joint design reduces significant weight and significant risk of durability issues in service; the trapezoidal panel pin joint design alleviates the induced stresses by allowing free rotation at the upper surface of the wing aft spar by use of a vertically oriented pin and vertical and horizontal flexible tee members allowing an added degree of freedom, and thus, the design of the invention releases two rotational degrees of freedom; the trapezoidal panel pin joint design allows a high deflection in a localized area and then uses flexible attachments a short distance away from the flexible joint; the trapezoidal panel pin joint and flexible tee members reduce induced loading from wing bending and allow the overwing joint to flex with wing deflection and fuselage pressurization; the trapezoidal panel pin joint design allows a trapezoidal panel to be able to handle wing deflections without inducing high loads into the joint; the trapezoidal panel pin joint design allows the fixed pressure deck and floor beams to be located in close proximity to the wing upper surface on a composite or metal aircraft without inducing high deflections or point loads into the aircraft fuselage, and thus enables efficient space utilization by locating the fixed pressure deck and wing upper surface in close proximity to each other; and, the trapezoidal panel pin joint design allows weight and space saving within the composite structure architecture of an aircraft.

The disclosure provides for a trapezoidal panel pin joint to allow deflection of an aircraft between a fuselage section and a wing section, the pin joint comprising a vertical pin portion, a lug portion, and a clevis portion, and the pin joint is positioned at a wing rear spar of the aircraft. At least one vertical flexible tee member is positioned below the pin joint. The pin joint is coupled to at least two horizontal flexible tee members, such that the pin joint and the vertical flexible tee member allow for vertical rotation at the wing rear spar, and such that the horizontal flexible tee members allow for horizontal rotation at a wing/fuselage joint. Preferably, the vertical flexible tee member has a vertical flexible rabbet within the member, and the horizontal flexible tee member has a horizontal flexible rabbet within the member. The pin joint allows a trapezoidal panel of the fuselage section to be able to handle deflections in the wing section without inducing high loads into the joint. In another aspect of the disclosure, the disclosure provides for a flexible fuselage point to enable deflection of an aircraft without high strain comprising a panel pin joint and flexible tee members that, in combination, allow a wing/fuselage joint to rotate with wing deflection and fuselage pressurization, in conjunction with a vertical degree of rotation at a wing rear spar.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings which illustrate preferred and exemplary embodiments, but which are not necessarily drawn to scale, wherein.

DETAILED DESCRIPTION OF THE INVENTION

The invention now will be described more fully hereinafter with reference to the accompanying drawings, in which some, but not all embodiments of the invention are shown. Indeed, this invention may be embodied in several different forms and should not be construed as limited to the embodiments set forth herein. Rather, these embodiments are provided so that this disclosure will be thorough and complete and will fully convey the scope of the invention to those skilled in the art. Like numbers refer to like elements throughout.

Figure 1:
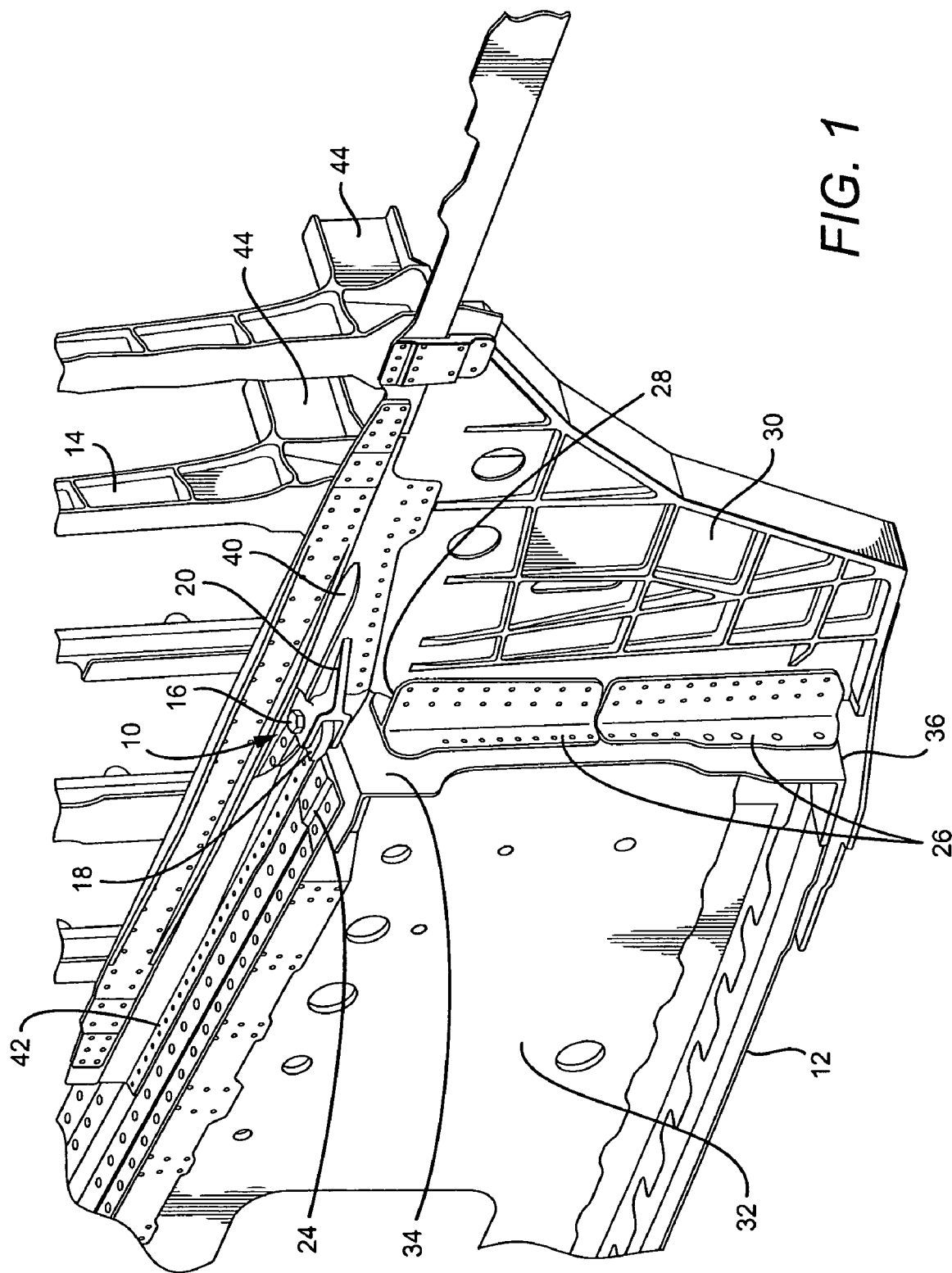
FIG. 1 is a perspective view illustrating the trapezoidal panel pin joint of the invention engaged with the wing and fuselage of an aircraft.
Figure 2:
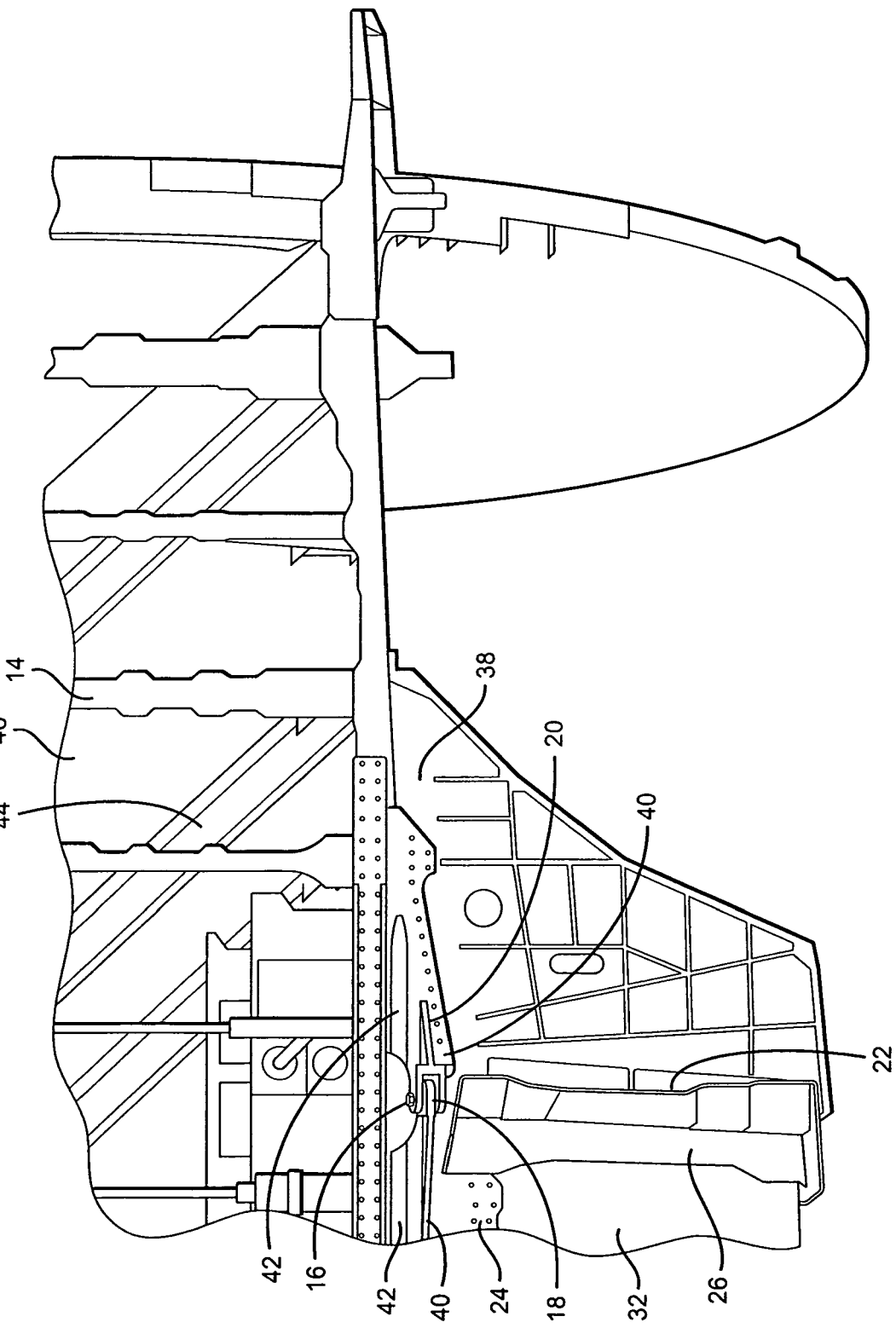
FIG. 2 is a perspective view illustrating the trapezoidal panel pin joint flex zone and the pressure deck at the trapezoidal panel.
Figure 3:
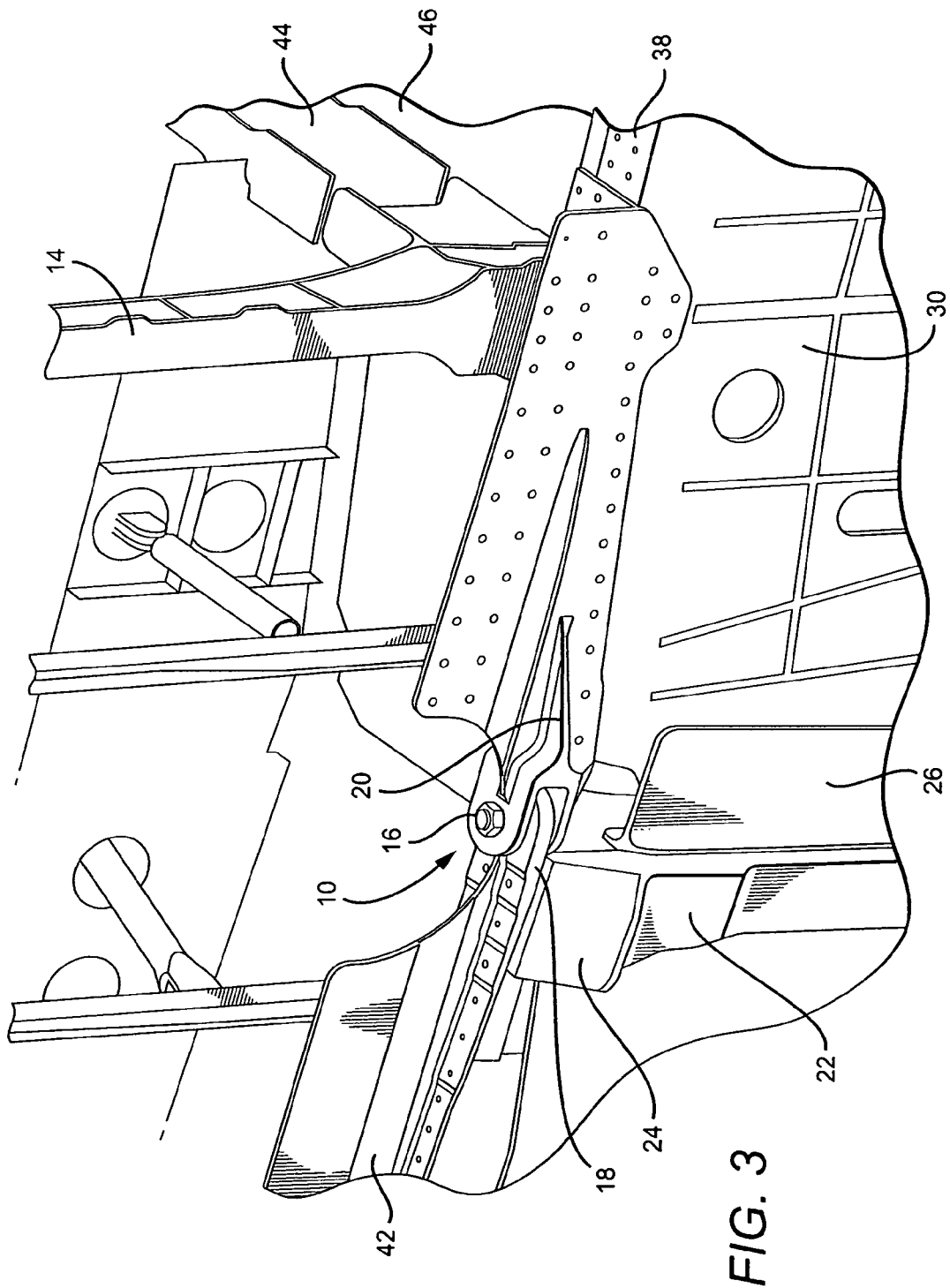
FIG. 3 is a perspective view illustrating the trapezoidal panel pin joint and rotations of the lug and clevis joint.
Figure 4:
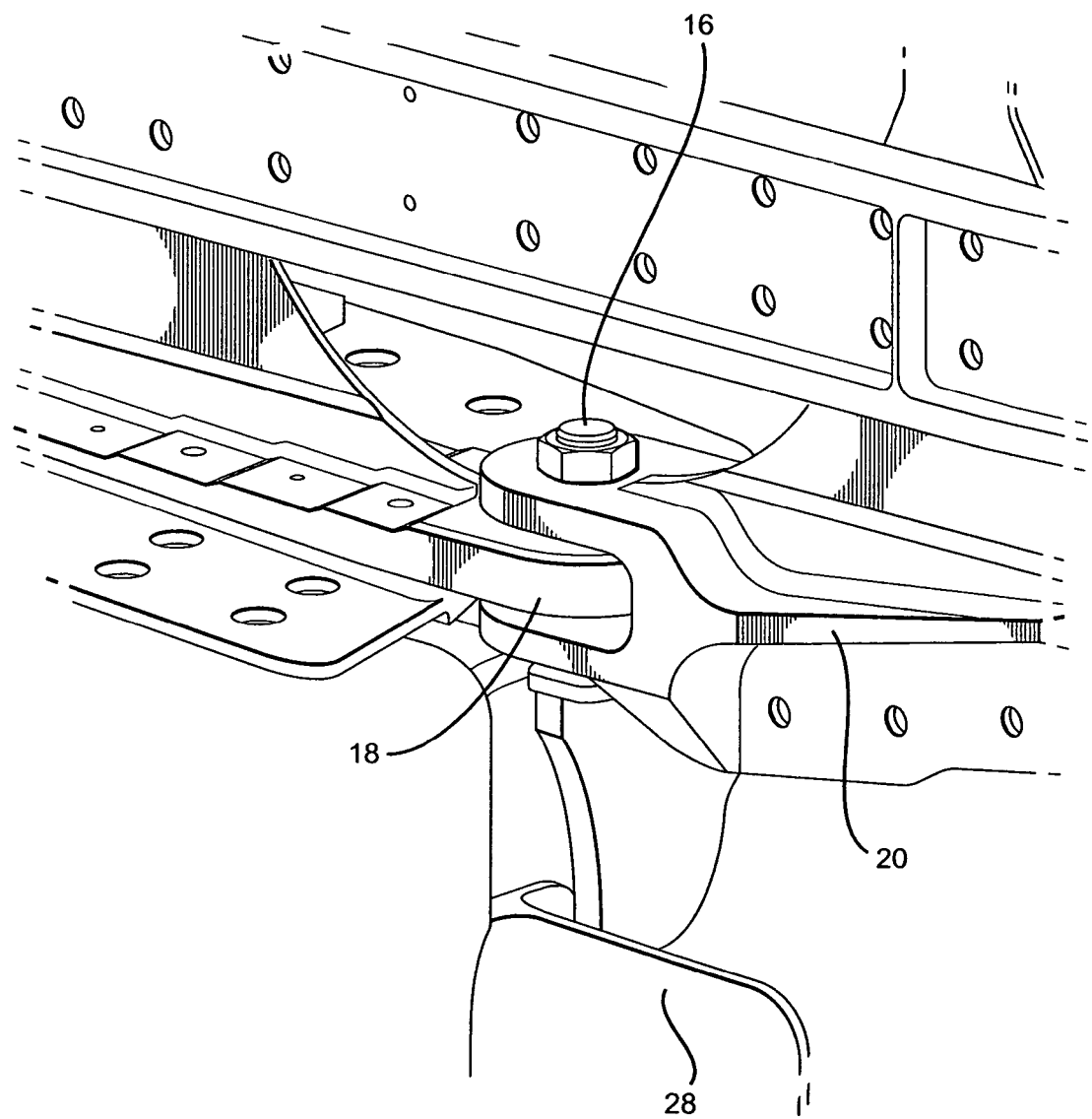
FIG. 4 is a close-up view of the trapezoidal panel pin joint of the invention; and, FIG. 5 is a schematic illustration of a cross-section of the fuselage showing the points of flexure.

Referring now to the drawings, and in particular, to FIG. 1, there is shown a perspective view illustrating a trapezoidal panel pin joint 10 of the invention engaged with a wing portion 12 and a fuselage or body portion 14 of an aircraft. Preferably, the invention is used with large commercial aircraft. However, the invention may also be used with noncommercial aircraft. The pin joint 10 preferably comprises a vertical pin portion 16, a lug portion 18 and a clevis portion 20. The length of the vertical pin portion 16 depends on the load of the airplane. The vertical pin portion 16 is oriented vertically to the lug 18 and clevis 20. The pin joint 10 is located or positioned at a wing rear spar 22 at a wing upper surface 24 (see FIG. 2). Preferably, the pin joint is made of high strength corrosion resistant steel. However, the pin joint may also be made of other suitable high strength corrosion resistant metal alloys. Oriented below the pin joint 10 is at least one vertical flexible tee member 26. Preferably, two vertical flexible tee members 26 are used. However, a greater number of vertical flexible tee members may also be used with the invention. Preferably, the vertical flexible tee member is made of titanium. However, the vertical flexible tee member may also be made of steel or other suitable hard metals. A vertical flexible rebbet 28 is within each vertical flexible tee member. The pin joint 10 and vertical flexible tee members 26 connect a trapezoidal panel 30 to the wing rear spar 22 allowing flexibility of the wing/body connection. The trapezoidal panel 30 at a wing side of body rib 32 on each side of the fuselage 14 is attached at the wing rear spar 22 with the lug portion 18 which doubles as the wing fuselage horizontal flexible tee on the wing side of the joint, and the clevis portion 20 which also doubles as the wing fuselage horizontal flexible tee on the trapezoidal panel side of the joint. The lug portion 18 and clevis portion 20 are attached with the vertical pin portion 16 which is oriented vertically to the lug and clevis portions. The vertical flexible tee members 26 are attached to the trapezoidal panel 30 and wing rear spar 22 at a top end 34 of the trapezoidal panel and a bottom end 36 of the trapezoidal panel 30. The vertical flexible tee members 26 are designed to absorb deflections at the top 34 and bottom 36 of the trapezoidal panel 30. Deflection at the bottom 36 of the trapezoidal panel 30 is approximately one half (½) inch outboard. Deflection at the top 34 of the trapezoidal panel is approximately one half (½) inch inboard. The combination of the deflections at the top 34 and bottom 36 and the attachment to a fixed pressure deck 46 and the fuselage frames thirty-six inches aft lead to the need for the vertical flexible tee members 26. The vertical pin 16 centerline is oriented in line with the vertical flexible rebbet 28 in the vertical flexible tee members 26 to define a line of rotation of the trapezoidal panel 30 to the wing rear spar 22. The trapezoidal panel 30 includes an upper chord portion 38. The pin joint 10 is further coupled to at least two horizontal flexible tee members 40. However, a greater number of horizontal flexible tee members may also be used with the invention. The horizontal flexible tee members are preferably positioned on each side of the pin joint opposite one another. Preferably, the horizontal flexible tee members are made of titanium. However, the horizontal flexible tee members may also be made of steel or other suitable hard metals. A horizontal flexible rebbet 42 is within each horizontal flexible tee member. The horizontal flexible tee member acts as a hinge at the joint between the fuselage and the wing. Allowing the structure of the wing and fuselage to rotate absorbing the deflections of the wing upper surface 24 greatly reduces deflection induced stresses while providing a forward/aft load path for the large wing/body loads. At the lug and clevis portions, the wing structure moves inboard approximately one half (½) inch due to wing bending while the fuselage frame and pressure deck 46 thirty-six inches aft does not. The trapezoidal panel pin joint allows the design of the trapezoidal panel to be able to handle the wing deflections without inducing high loads into the joint. FIG. 2 is a perspective view illustrating the pin joint flex zone and the pressure deck at the trap panel. FIG. 3 is a perspective view illustrating the pin joint and rotations of the lug and clevis joint. FIG. 4 is a close-up view of the pin joint. In another aspect of the invention, the invention provides a flexible fuselage point to enable deflection of an aircraft without high strain comprising a panel pin joint 10 and flexible tee members 26, 40 that, in combination, release two rotational degrees of freedom.

FIG. 5 is a schematic illustration of a cross-section of the fuselage showing the points of flexure. FIG. 5 shows the shape of the pressurized fuselage—48; the initial (unloaded) position—50; the deflected shape under the wing bending (unpressurized)—52; the bulged fuselage shape without transverse floor beams as tension ties—54; the inward movement at the corner of the wingbox that results in rotation of the lug portion and clevis portion—56; the flexible tee members being bent by the wing bending and cabin pressurization—58; the additional rotation of wing/fuselage joint due to fuselage pressure and wing bending—60; and the frames incorporating flexures immediately above the passenger floor—62.

The invention allows for a high deflection in a localized area and uses vertical and horizontal flexible tee members 26, 40, respectively, a short distance away from the flexible joint. Preferably, the distance is at least two inches or greater. This eliminates the need for a separation between the fixed pressure deck 46 and floor beams 44 of the aircraft and the wing upper surface at the rear spar and eliminates the use of large fittings and thick panels to force the fuselage to conform to the wing deflections. The trapezoidal panel and the fixed pressure deck are in line in the same horizontal plane. This invention allows the wing rear spar to be located in close proximity to the fixed pressure deck and floor beams on a composite or metal aircraft without inducing high deflections or point loads into the aircraft fuselage. In the design of the invention, the top of the trapezoidal panel and the pressure deck are virtually coincidental requiring the trapezoidal panel itself to absorb the deflection and incur large deflection induced stress. The pin joint design of the invention alleviates the induced stresses by allowing free rotation at the upper surface of the wing rear spar by use of the vertically oriented pin and vertical flexible tee members which allow an added degree of freedom or rotation. Thus, the invention allows two rotational degrees of freedom. The pin joint and vertical flexible tee member release a first degree of freedom, and the horizontal flexible tee members release a second degree of freedom. The increased degree of freedom is a vertical rotation. The released vertical degree of freedom means that the pin joint increases the ability of the fuselage and wing to rotate without inducing a moment into the joint. The invention allows the overwing joint to flex with wing deflection and fuselage pressurization, in conjunction with the vertical degree of rotation. This invention enables weight and space saving within the aircraft composite or metal structure architecture. The design of the pin joint of the invention has the advantages of reducing significant weight and reducing significant risk of durability issues in service.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed that modifications and other embodiments are intended to be included within the scope of the appended claims. Although specific terms are employed herein, they are used in a generic and descriptive sense only and not for purposes of limitation.

What is claimed is:

1. A trapezoidal panel pin joint for allowing deflection of an aircraft between a fuselage section and a wing section, the pin joint comprising a vertical pin portion, a lug portion, and a clevis portion, and the pin joint is positioned at a wing rear spar of the aircraft; and at least one vertical flexible tee member is positioned below the pin joint; and the pin joint is coupled to at least two horizontal flexible tee members, such that the pin joint and vertical flexible tee member allow for vertical rotation at the wing rear spar, and such that the horizontal flexible tee members allow for horizontal rotation at a wing/fuselage joint.

2. The pin joint of claim 1 wherein the pin joint and the vertical flexible tee member connect the wing rear spar to a trapezoidal panel.

3. The pin joint of claim 2 wherein the vertical flexible tee member absorbs deflections at a top end and a bottom end of the trapezoidal panel.

4. The pin joint of claim 1 wherein the vertical flexible tee member has a vertical flexible rabbet.

5. The pin joint of claim 1 wherein each of the horizontal flexible tee members has a horizontal flexible rabbet.

6. The pin joint of claim 1 wherein the horizontal flexible tee member separates the fuselage section and a top portion of the wing section.

7. The pin joint of claim 1 wherein the number of vertical flexible tee members is two.

8. The pin joint of claim 1 wherein the horizontal flexible tee members are positioned on each side of the pin joint opposite one another.

9. The pin joint of claim 1 wherein the pin joint allows a trapezoidal panel of the fuselage section to be able to handle deflections in the wing section without inducing high loads into the wing/fuselage joint.

10. The pin joint of claim 9 wherein the trapezoidal panel and a fixed pressure deck are in line in a horizontal plane.

11. A trapezoidal panel pin joint for allowing deflection between a fuselage section and a wing section of an aircraft, the pin joint comprising a vertical pin portion, a lug portion, and a clevis portion, and the pin joint is positioned at a wing rear spar of the aircraft; and at least one vertical flexible tee member having a vertical flexible rabbet is positioned below the pin joint, and along with the pin joint, connects a trapezoidal panel in the fuselage section to the wing rear spar; and the pin joint is coupled to at least two horizontal flexible tee members each having a horizontal flexible rabbet, such that the pin joint and the vertical flexible tee member allow for vertical rotation at the wing rear spar, and such that the horizontal flexible tee members allow for horizontal rotation at a wing/fuselage joint.

12. The pin joint of claim 11 wherein the pin joint allows the trapezoidal panel in the fuselage section to be able to handle deflections in the wing section without inducing high loads into the wing/fuselage joint.

13. The pin joint of claim 11 wherein the vertical pin portion is oriented vertically to the lug portion and the clevis portion.

14. The pin joint of claim 11 wherein the trapezoidal panel and a fixed pressure deck are in line in a horizontal plane.

* * * * *